United States Patent
Takita

(10) Patent No.: US 6,585,156 B2
(45) Date of Patent: Jul. 1, 2003

(54) MULTICHANNEL MAGNETIC HEAD, METHOD OF MANUFACTURING A MULTICHANNEL MAGNETIC HEAD, AND A CARD READER USING THE SAME

(75) Inventor: Yukihiko Takita, Nagano (JP)

(73) Assignee: Sankyo Seiki Mfg. Co., Ltd., Nagano (JP)

(*) Notice: Subject to any disclaimer, the term of this patent is extended or adjusted under 35 U.S.C. 154(b) by 0 days.

(21) Appl. No.: 10/047,377

(22) Filed: Mar. 28, 2002

(65) Prior Publication Data

US 2002/0158125 A1 Oct. 31, 2002

Related U.S. Application Data

(62) Division of application No. 09/544,155, filed on Apr. 6, 2000.

(30) Foreign Application Priority Data

Apr. 8, 1999 (JP) ............................................. 11-101726

(51) Int. Cl.$^7$ ................................................. G06K 7/08
(52) U.S. Cl. ...................... 235/449; 235/440; 360/121; 360/291.3
(58) Field of Search ................................. 235/435, 439, 235/440, 449, 450; 324/212; 396/319; 360/2, 119, 121, 123, 129, 291.2, 291.3, 240

(56) References Cited

U.S. PATENT DOCUMENTS 3,978,523 A * 8/1976 Tanaka et al. .............. 360/121
4,028,734 A * 6/1977 Mos ............................ 360/104
4,940,938 A * 7/1990 Naito et al. ................. 324/212
5,160,833 A * 11/1992 Nakahara .................... 235/449
5,196,680 A * 3/1993 Schuder ...................... 235/449
5,296,990 A * 3/1994 Kamimura et al. ......... 360/119
5,378,885 A * 1/1995 Jones, Jr. et al. ........... 235/449
5,666,249 A * 9/1997 Ohmori et al. ............. 360/123
6,195,512 B1 * 2/2001 Tsujimoto ................... 396/319
6,250,552 B1 * 6/2001 Hirasawa ................ 235/449 X

FOREIGN PATENT DOCUMENTS

JP           10-154317 A   *   6/1998

* cited by examiner

Primary Examiner—Michael G. Lee
Assistant Examiner—Jared J. Fureman
(74) Attorney, Agent, or Firm—Reed Smith LLP

(57) ABSTRACT

A multichannel magnetic head includes a plurality of sets of magnetic core half bodies, each of the sets having two of the half bodies facing each other, and a plurality of magnetic gap portions, each of the gap portions located where two magnetic core half bodies face each other. The plurality of magnetic gap portions, when a magnetic medium is inserted therein, transferring record data between the magnetic medium and the magnetic head, and the gap distances of the magnetic gap portions being differentially preset to accommodate a physically warped magnetic medium. A magnetic card reader including a multichannel magnetic head has a plurality of magnetic gap portions, and the multichannel magnetic head is capable of recording data onto a magnetic medium in contact therewith. The multichannel magnetic head has gap distances that can be modified based on a possibility of spacings between the multichannel magnetic head and the magnetic medium so that a warped card can be accommodated.

10 Claims, 19 Drawing Sheets

MULTICHANNEL MAGNETIC HEAD, METHOD OF MANUFACTURING A MULTICHANNEL MAGNETIC HEAD, AND A CARD READER USING THE SAME

This is a division of application Ser. No. 09/544,155, filed Apr. 6, 2000.

BACKGROUND OF THE INVENTION

The present invention relates to a multichannel magnetic head and a method for manufacturing the multichannel magnetic head and a card reader using the same. More specifically, the present invention relates to improvements in a magnetic recording means to record magnetic data onto a magnetic card.

When a magnetic head that reads and records magnetic data from and a magnetic medium, such as a magnetic card, is sufficiently in contact with the magnetic card, recording (writing) is easily performed and reading and recording can be excellently performed. However, the contact between the magnetic head and the card may not always be sufficiently good thus potentially causing unacceptable results.

For example, and with reference to FIG. 32, when magnetic recording portion 102 of magnetic card 101 is formed in three tracks (also called "channels"), a space exists between magnetic head 103 and magnetic card 101 if the card is warped. As a result, especially when the second channel in the middle is separated from magnetic head 103, recording and reading may not be sufficiently performed. The same phenomenon can be observed with multichannel magnetic card 101 having a plurality of channels wherein magnetic information may not be sufficiently transferred in the vicinity of the center of magnetic recording portion 102 due to spacing.

The above problem would not occur if magetic cards never warp. However, it is difficult to completely prevent a card from warping. JIS (Japanese Industrial Standard) allows a spacing that is less than 2 mm between the magnetic recording portion 102 and magnetic head 103, taking into account the possibility that magnetic card 101 is slightly warped.

Magnetic card 101 tends to have a high coercive force and recently magnetic heads have been designed for high-coercive-force-cards. As a result of such design, recording of magnetic information is not sufficiently performed even when the spacing between the magnetic card and a magnetic head is within the allowance (e,g, 2 mm). While a higher coercive force is provided to the card to improve the coercive force of the recording magnetism and thus the coercive force itself is improved, magnetic recording ability is nonetheless substantially reduced as compared to the sufficient recording achieved by a conventional magnetic card and magnetic head when low coercive force is used. Therefore, even when the spacing is within the allowance, magnetic recording to magnetic card 101, especially to the second channel, may not be sufficiently performed.

When magnetic card 101 is transferred to the magnetic card reader, the magnetic card is pressed against magnetic head 103 by a pat roller during recording and reproduction. However, when the surrounding temperature is low, the magnetic card tends to harden which in turn prevents the card from flattening out by the pressing. The operation of a magnetic card reader generally is guaranteed between temperatures of 0 to 50C. When the temperature falls below this range, the above-mentioned problem becomes prominent.

OBJECTS AND SUMMARY OF THE INVENTION

Therefore, it is an object of the present invention to provide a multichannel magnetic head and a method for manufacturing a multichannel magnetic head in which magnetic information is sufficiently recorded even when a relatively large space exists between the magnetic recording portion and the magnetic head due to warping of the magnetic card.

It is a further object of the present invention intends to provide a magnetic card reader using the above multichannel magnetic head.

Various other objects, advantages and features of the present invention will become readily apparent to those of ordinary skill in the art, and the novel features will be particularly pointed out in the appended claims.

To achieve the object stated objects, and in accordance with the present invention, there is provided a plurality of channels, that form the magnetic recording portion of a magnetic card, that have different density of recording magnetism. By applying this characteristic feature of the present invention to a card reader, recording can be sufficiently performed even when a relatively large spacing exists between a high coercive force card and a coercive magnetic head.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 4 is a schematic plan view of the multichannel magnetic head showing a difference in gap distances of magnetic gap portions, wherein

DETAILED DESCRIPTION OF CERTAIN PREFERRED EMBODIMENTS

Figure 1:
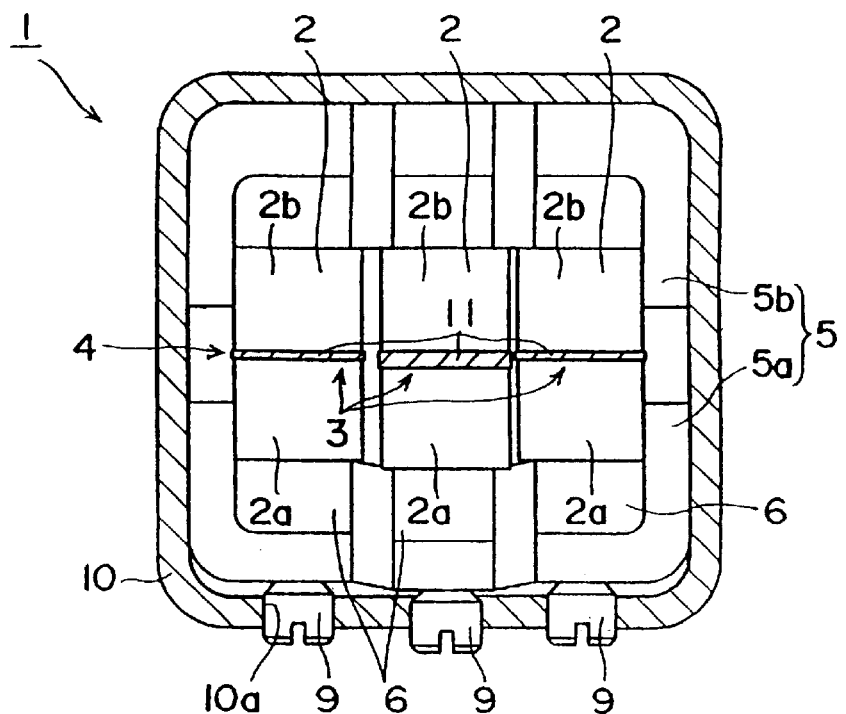
FIG. 1 is a plan view of a partial cross section showing an embodiment of a multichannel magnetic head in accordance with the present invention.

An embodiment of a magnetic head, a method for manufacturing of a magnetic head and a magnetic card reader using the magnetic head in accordance with the present invention are shown with reference to FIGS. 1 to 11 of the drawings. Multichannel magnetic head 1 (or simply "magnetic head 1") is designed so that a plurality of magnetic core half bodies 2a, . . . , 2a and 2b, . . . , 2b are placed to face each other and magnetic gap portions 4, . . . , 4 are formed at facing portions 3 and are brought into contact with a magnetic medium to record data onto a plurality of channels of the magnetic medium. In this embodiment, three parallel magnetic cores 2, 2, 2, around which coils 12 are wound, are held by core holder 5, and are placed in case 10 and fixed therein by pouring a resin and the like therein to integrally form magnetic head 1.

Magnetic head 1 is designed so that gap distances $t_1$, $t_2$, $t_3$ in magnetic gap portions 4 of magnetic cores 2, 2, 2 for the first, second and third channels ("CH" in FIG. 4) are changed based on the possibility of the spacing with the magnetic medium. Specifically, within magnetic head 1, gap distance $t_2$ of magnetic gap portion 4 corresponding to the second channel is established to be larger than gap distances $t_1$ and $t_3$ of magnetic gap portions 4, which correspond to the first and the third channels, respectively, on the sides of the second channel.

In the following embodiment, magnetic cores 2, . . . , 2 are laid in parallel such that magnetic head 1 comprises three channels. However, this is just one example of a magnetic head having a plurality of channels, the number of channels to be formed on the magnetic head can be modified.

The following describes a configuration of the present invention in detail. Magnetic cores 2, 2, 2 forming magnetic head 1 are identically shaped magnetic cores (iron cores) and collectively form the entire magnetic core. Coil 12 is wound around each of the magnetic cores 2, 2, 2 to independently establish magnetism for three channels. In this embodiment, identically shaped magnetic cores 2, 2, 2 are laid in parallel as shown in the figures. However, in the case of increased number of magnetic cores to be laid parallel, for example, magnetic cores 2 can be formed to be of divergent shapes such that the distance among them becomes wider in the direction from the side of gap portion 4 to the base side, since coils 12 and bobbins, around which coils are wound, need to be formed on each of magnetic cores 2, 2, 2.

Figure 7:
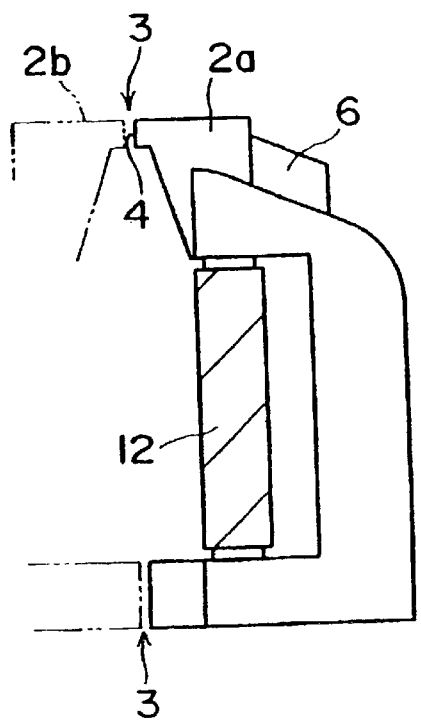
FIG. 7 is a side view showing a core holder half body holding a magnetic core half body.
Figure 8:
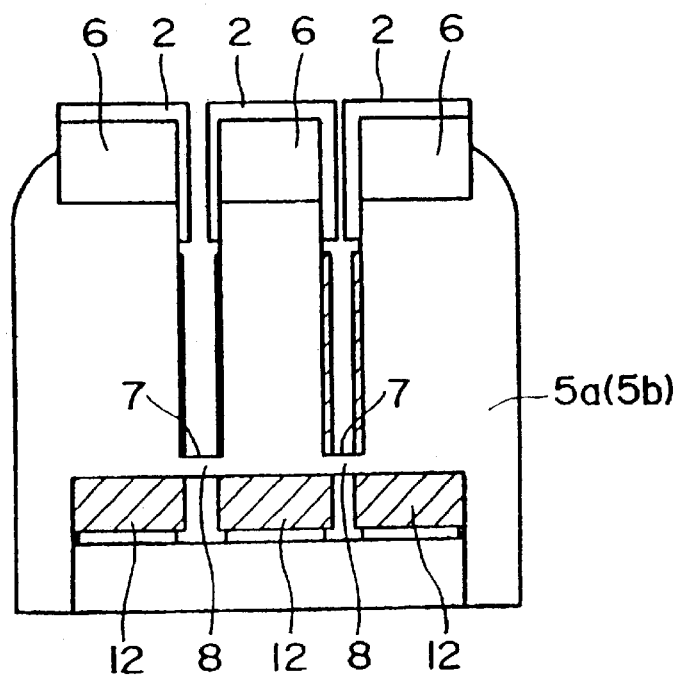
FIG. 8 is a rear view showing a core holder half body holding a magnetic core half body.

Magnetic cores 2 are designed so that magnetic core half bodies 2a, 2b are coupled to form an approximate U, as shown in FIG. 7, and positioned as shown in FIG. 1. Paired magnetic core half bodies 2a, 2b, as shown in FIG. 7, are placed to face each other at facing portion 3 on two ends thereof, on the side of the gap portion and the base side. On the base side, surfaces of facing portions 3, 3 directly face each other while facing portions on the side of magnetic gap portions 4 indirectly face each other having spacers 11 therein, as shown in FIG. 1, such that magnetic gaps are formed. In the case of magnetic head 1 shown in the figure, three magnetic gap portions 4, 4, 4 are formed by having three parallel magnetic core half bodies 2a, 2a, 2a placed to face other three magnetic core half bodies 2b, 2b, 2b wherein each of the magnetic gap portions are capable of magnetic recording for three independent channels.

Figure 5:
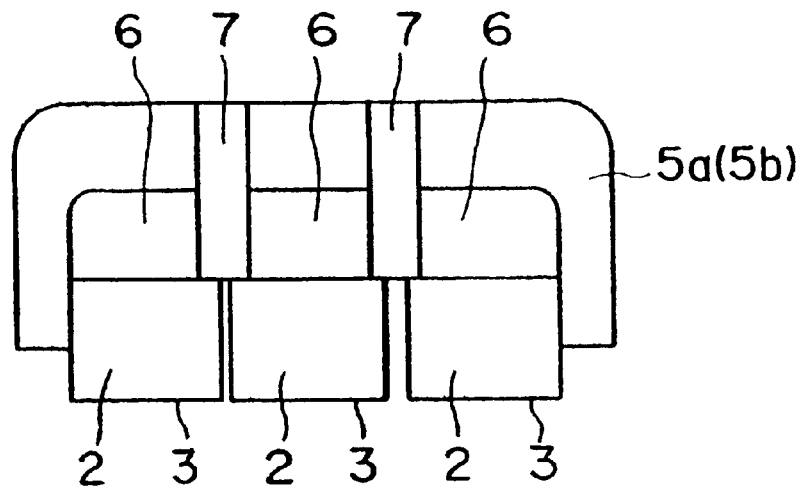
FIG. 5 is a plan view showing a core holder half body holding a magnetic core half body.
Figure 6:
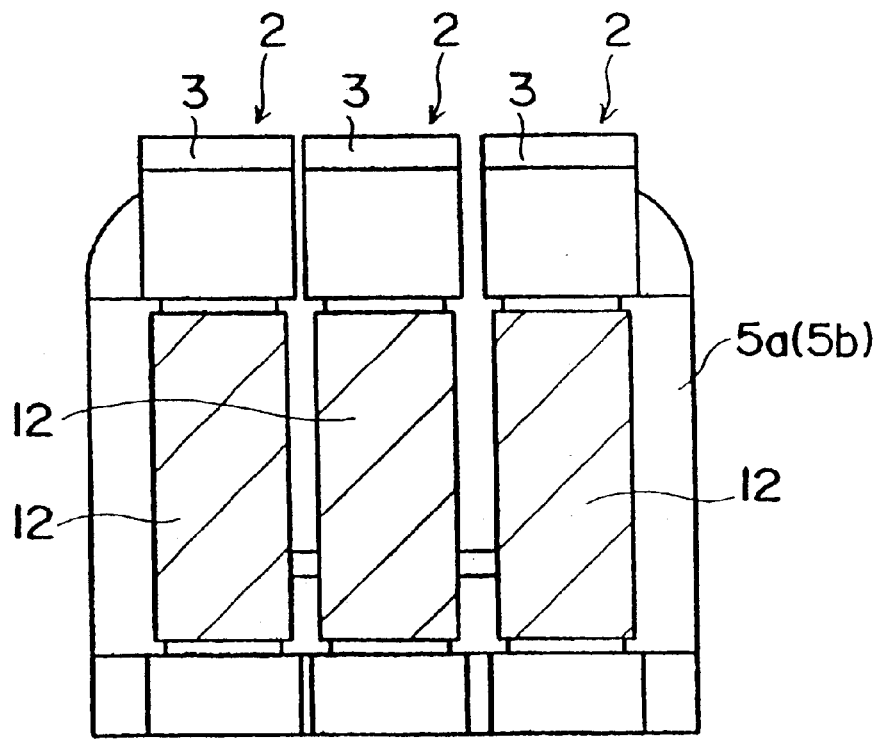
FIG. 6 is a front view showing a core holder half body holding a magnetic core half body.

Further, facing portion 3 of magnetic core half bodies 2a, 2b are positioned to be on a straight line, as shown in FIG. 5, when magnetic core half bodies 2a, 2b are assembled into core holders 5. In this arrangement, gap distance t is not established for a given width yet. Then, desired gap distances $t_1$, $t_2$, $t_3$ are obtained by inserting spacers 11, . . . , 11 of a given thickness in each of facing portions 3, . . . , 3, and therefore it is not necessary to form facing portion 3 of magnetic core 2 in advance for the second channel as if magnetic core 2 were pulled towards the outside of magnetic head 1 compared to facing portion 3 of the first or the third channel.

Figure 4A:
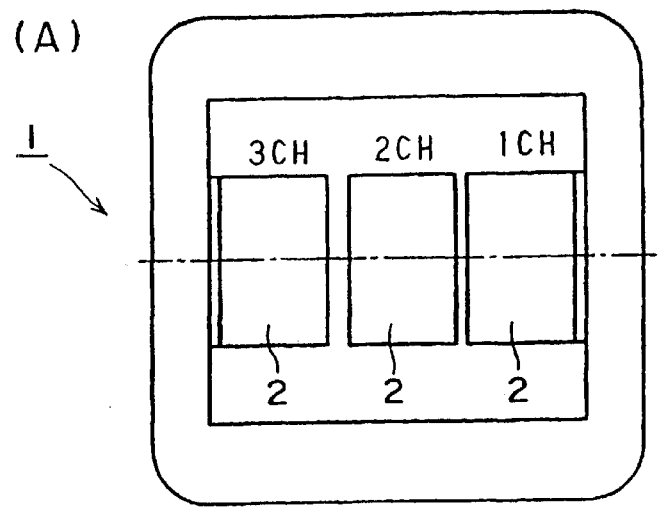
FIG. 4(A) shows the entire magnetic head and FIG. 4(B) shows an enlarged magnetic core portion.
Figure 4B:
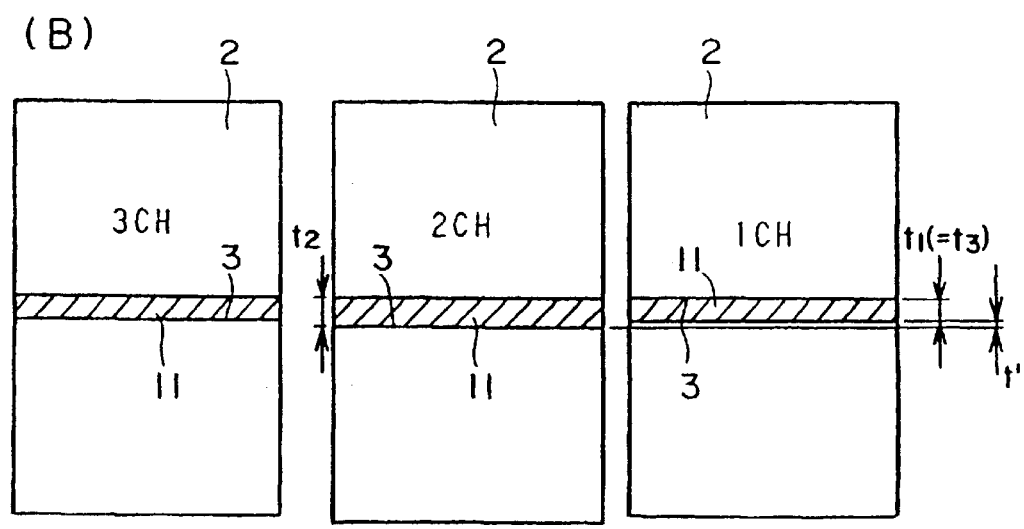

Spacer 11 inserted in facing portion 3 of magnetic core 2 can be of known technology. However, as shown in FIG. 4, the thickness of spacers 11 is formed identical for the first channel and the third channel ($t_1=t_3$) while the thickness of the spacer for the second channel is formed to be thicker such that gap distance $t_2$ becomes wider.

Also, coils 12, 12, 12 wound around three parallel magnetic cores 2, 2, 2 can be formed perpendicular to magnetic core half bodies 2a, 2b, as shown in FIG. 7, or can be parallel to the base side of magnetic core 2. Although not shown in the figure, the shape of the bobbins, around which coils 12 are wound, is not limited to any particular shape, and should be designed according to the shape of magnetic cores 2.

Figure 9:
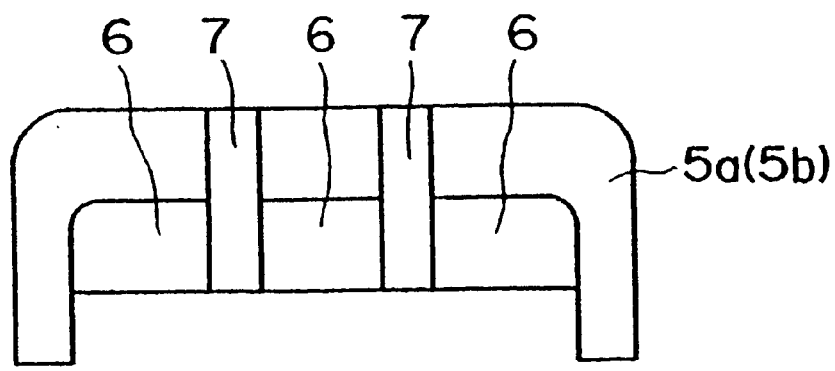
FIG. 9 is a plan view of the core holder half body.
Figure 10:
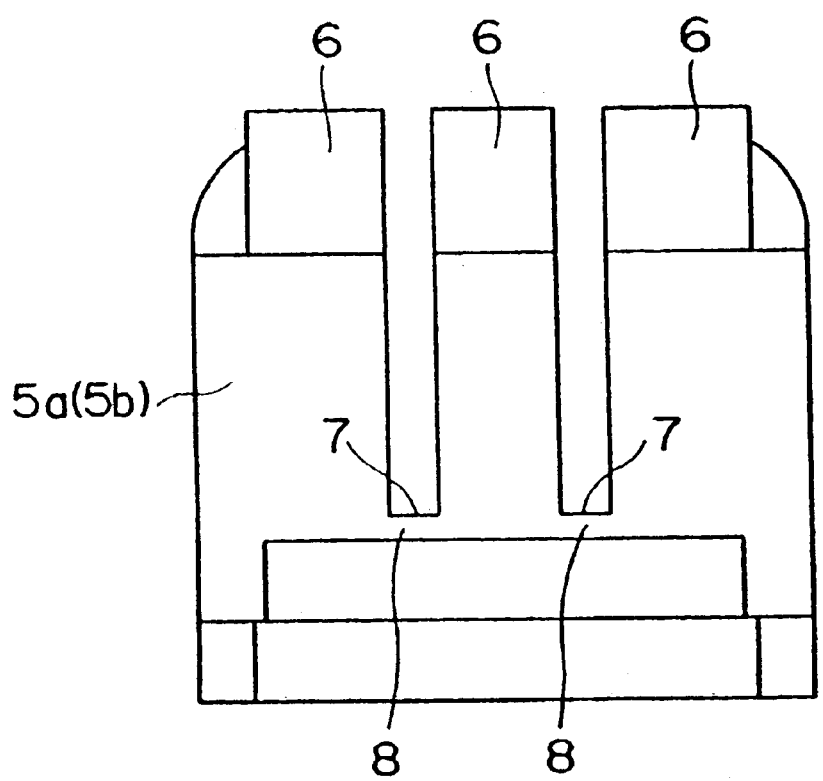
FIG. 10 is a front view of the core holder half body.
Figure 11:
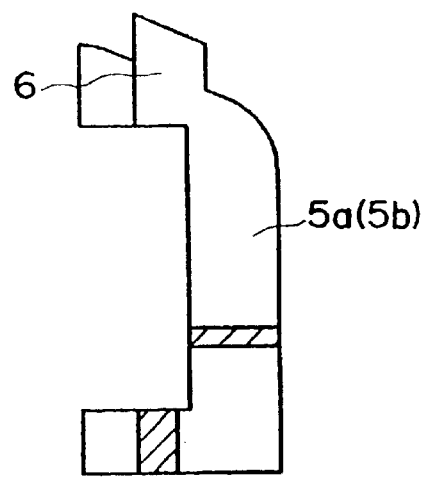
FIG. 11 is a side view of the core holder half body.

Core holder 5 is divided in half in the vertical direction, as shown in FIGS. 9 through 11, wherein a pair of core holder half bodies 5a, 5b having an identical shape is combined with each other to form one core holder 5. Core holder half bodies 5a, 5b, as shown in FIG. 1, are placed to face each other while holding magnetic core half bodies 2a, 2b, respectively, to form core holder 5 holding magnetic core 2. In this case, one of core holder half bodies 5a is adjusting core holder 5a which adjusts gap distance $t_1$, $t_2$, $t_3$ via magnetic core holding portions 6, 6, 6. On the other hand, another core holder half body 5b is opposing core holder 5b which faces adjusting core holder 5a. Adjusting member 9 is formed on adjusting core holder 5a.

Additionally, adjusting core holder 5a and opposing core holder 5b, as shown in FIG. 10, comprise three projecting magnetic core holding portions 6, 6, 6 to hold magnetic cores 2, 2, 2 for three channels. In this case, grooves 7, 7 are used to form a plurality (three in this embodiment) of magnetic core holding portions 6, 6, 6 to correspond to the channels.

Grooves 7, 7, as shown in FIG. 10, are vertical grooves from the side of magnetic gap portion 4 to the base side wherein they divide the first channel from the second channel, and the second channel from the third channel. Grooves 7, 7 of this embodiment have a depth such that connecting portions 8, 8, which connect magnetic core holding portions 6, 6, 6 at the bottom of grooves 7, 7, have a given thickness. As a result, magnetic core holding portion 6 for the second channel ("second magnetic core holding portion" hereafter) has sufficient holding strength while second magnetic core holding portion 6 is rotatable, as if being twisted, around connecting portions 8, 8. Also, second magnetic core holding portion 6 has grooves 7, 7 on its both sides such that second magnetic core holding portion 6 may be formed to be flexible. Therefore, when a load is applied to the top of each magnetic core holding portion 6 in the horizontal direction, the amount of movement by which second magnetic core holding portion 6 becomes larger than one of other magnetic core holding portions 6, 6. Since a portion of magnetic core holding portions 6, 6, 6 on the side of magnetic gap portion 4 can be tilted for each of the channels in this embodiment, gap distances $t_1$, $t_2$, $t_3$ of magnetic gap portions 4 can be changed for each of the channels.

Figure 2:
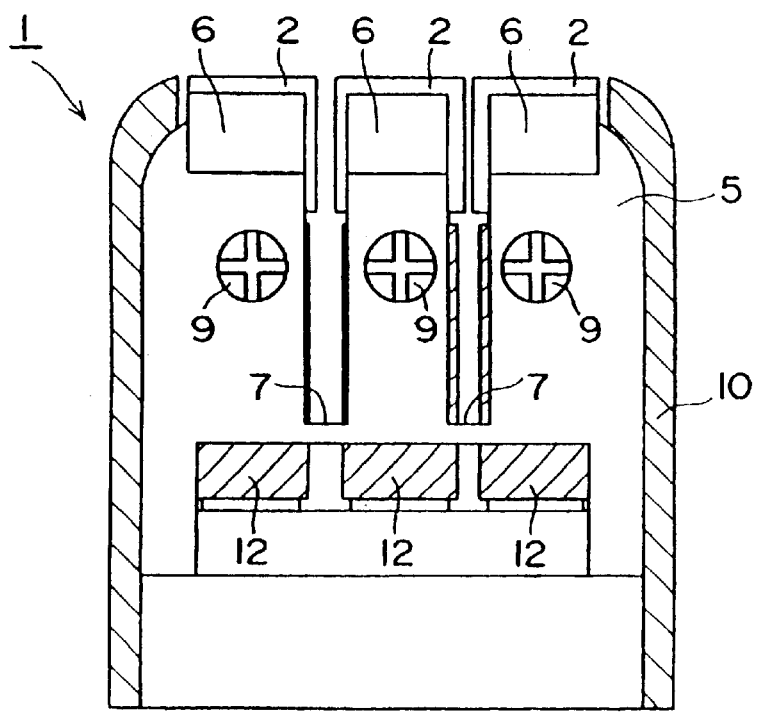
FIG. 2 is a front view of a partial cross section of the multichannel magnetic head.
Figure 3:
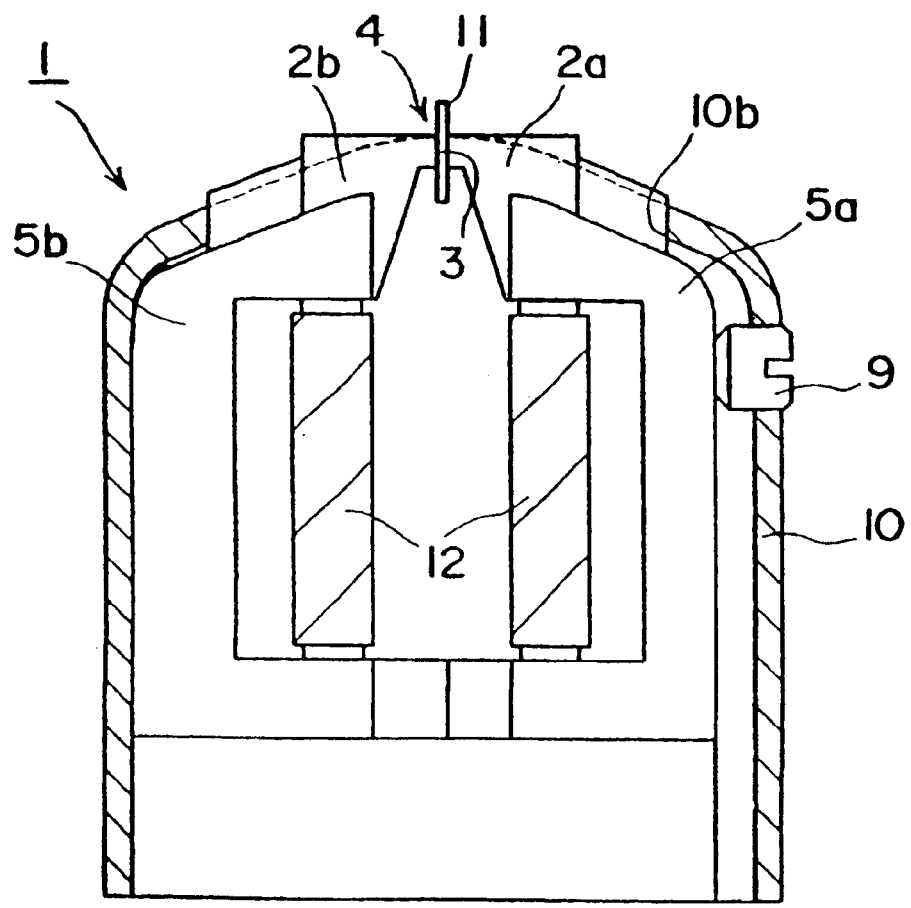
FIG. 3 is a side view of a partial cross section of the multichannel magnetic head.

As shown in FIGS. 1 through 3, adjusting core holder 5a has adjusting members 9, 9, 9 which independently adjust the tilt of magnetic core holding portions 6, 6, 6 in adjusting core holder 5a and which are formed between adjusting magnetic core holding portion 6, 6, 6 and case 10. Adjusting screw members are employed as adjusting members 9, 9, 9 which are screwed into case 10 in the horizontal direction from the outside. Gap distances $t_1$, $t_2$, $t_3$ at magnetic gap portions 4 are adjusted by pressing magnetic core holding portions 6, 6, 6 with these adjusting screw members towards magnetic gap portions 4. Also, to screw in the adjusting screw members on the side of adjusting core holder 5a, screw holes 10a, 10a, 10a are formed at corresponding positions on case 10 which surrounds magnetic head 1.

When adjusting members 9, 9, 9 are utilized, magnetic cores 2, 2, 2 and magnetic core holding portions 6, 6, 6 of core holder 5 are pushed toward opposing core holder 5b such that the tilt of magnetic core holding portions 6, 6, 6 of adjusting core holder 5a is adjusted in reference to opposing core holder 5b. A portion of the inside surface of case 10, which is entirely in contact with opposing core holder 5b, is formed to be plane.

Figure 12:
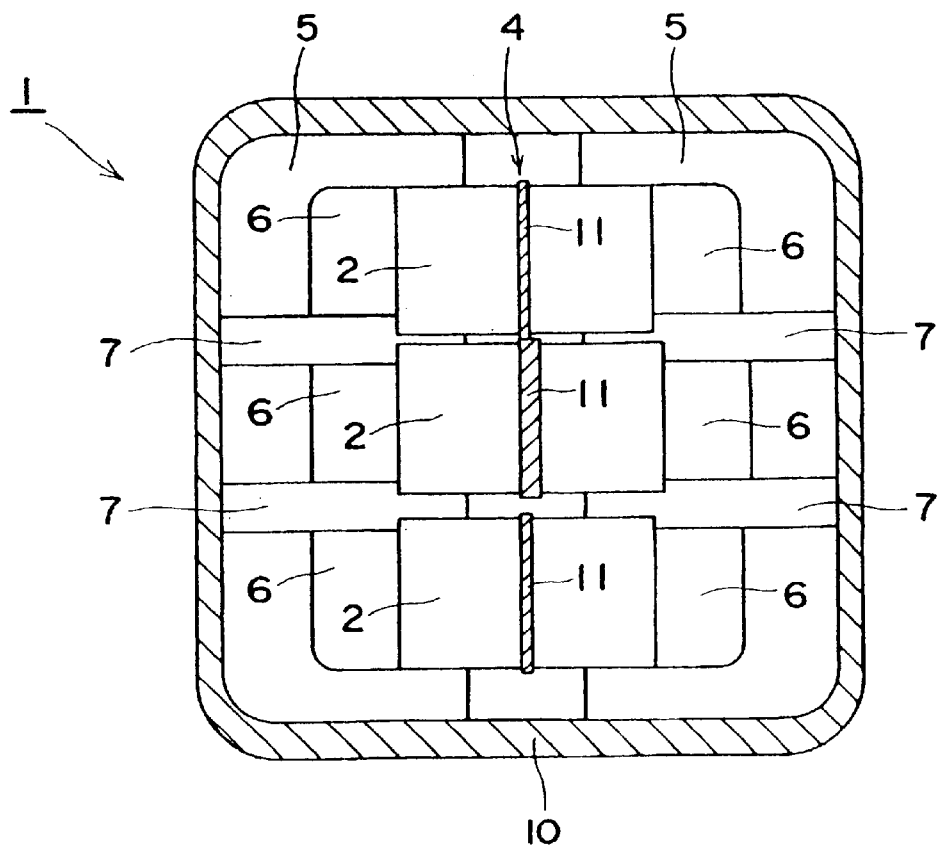
FIG. 12 is a plan view of a partial cross section showing a multichannel magnetic head in which gap distances of magnetic gap portions are adjusted without using adjusting screw members.

As described above, adjusting screw members are employed in this embodiment, but the form of adjusting members is not limited thereto. For example, an adjusting function similar to adjusting members 9 can be obtained by adjusting the relative size of magnetic cores 2, core holder 5 and case 10. As in magnetic head 1 shown in FIG. 12, they can be formed such that the outer circumference of core holder 5 becomes larger than the inner circumference of case 10 when core holder 5 is holding magnetic cores 2. In this case, case 10 applies inward pressure on magnetic cores 2 and core holder 5 which are placed inside case 10. As a result, gap distances $t_1$, $t_2$, $t_3$ can be established to given values as facing portion 3 of magnetic cores 2 are completely in contact with spacer 11, and second magnetic core holding portion 6 of adjusting core holder 5a is tilted by the thickness of spacer 11 and is maintained thereat.

Other than the above, narrowing the inner circumference of case 10, a pressing plate with a slant can be placed on the inner surface of case 10 (not shown in the figures). In this case, magnetic cores 2 and core holder 5 can be pressed against opposing surface of case 10 by using a rebounding force of the pressing plate which is warped when magnetic cores 2 and core holder 5 are placed in case 10. Further, by employing such a pressing plate along with the above adjusting screw members, the tilt adjustment of magnetic core holding portions 6, 6, 6 can be performed further accurately. Also, instead of the pressing plate, a spring means, which presses core holder 5 to one side in a similar manner, can be employed.

The following discussion presents a method of assembling magnetic head 1 in accordance with the present invention. First, as shown in FIGS. 5 through 8, magnetic core half bodies 2a, ..., 2a and 2b, ..., 2b are placed in core holder half bodies 5a, 5b, and, then, magnetic cores 2 are placed to face each other via spaces 11 in facing portion 3. As a result of these steps, a combination of magnetic cores 2 and core holder 5 is formed. Thereafter, as shown in FIGS. 1 through 3, core holder 5 holding magnetic cores 2 is placed in case 10, and a tilt of each of magnetic core holding portions 6, 6, 6 in adjusting core holder 5 is adjusted with adjusting members 9. In this case, second magnetic core holding portion 6 is held at a position slightly behind other magnetic core holding portions 6, 6 by the thickness of spacer 11, as shown in FIG. 1.

As described above, three-channel magnetic head 1 of this embodiment has channels with different gap distances $t_1$, $t_2$, $t_3$ such that the distribution of magnetic field strength generated in each of magnetic gap portions 4, 4, 4 can be changed. More specifically, in magnetic head 1 of this embodiment, the second channel is formed wider than the first and the third channels by $t'(=t_2-t_1)$, as shown in FIG. 4, such that the distribution of magnetic field strength in the second channel is relatively wider.

Therefore, when a space is generated in the second channel as spacing occurs between magnetic card and magnetic head 1 due to warping of the magnetic card, magnetic recording to the second channel can be sufficiently performed since the magnetic field strength of the second channel is varied from other channels. In this case, gap distances $t_1$, $t_2$, $t_3$ of magnetic gap portions 4, 4, 4 are changed based on a possibility of spacing with a magnetic medium such that an appropriate distribution of magnetic field strength can be generated according to occurrences of spacing.

Figure 31:
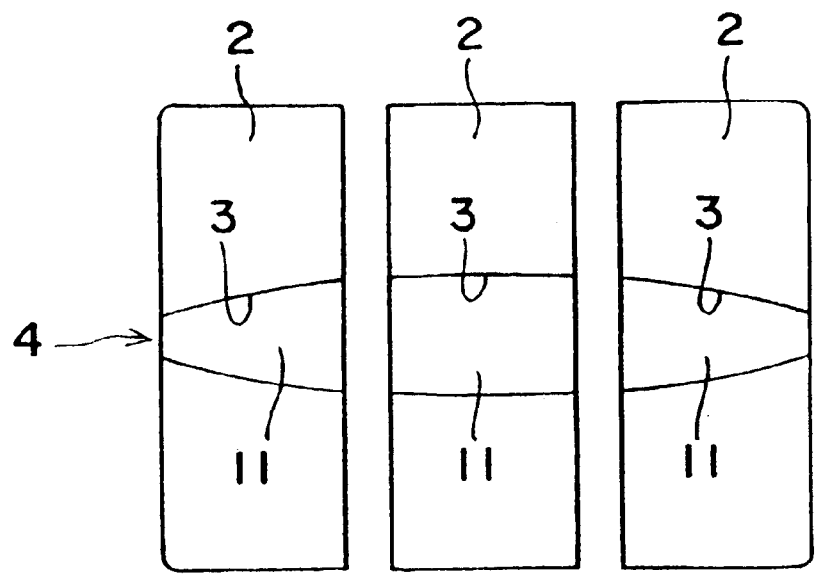
FIG. 31 is a schematic plan view showing magnetic cores which are formed such that a gap distance continuously changes in the direction of magnetic cores to be laid in parallel.
Figure 32:
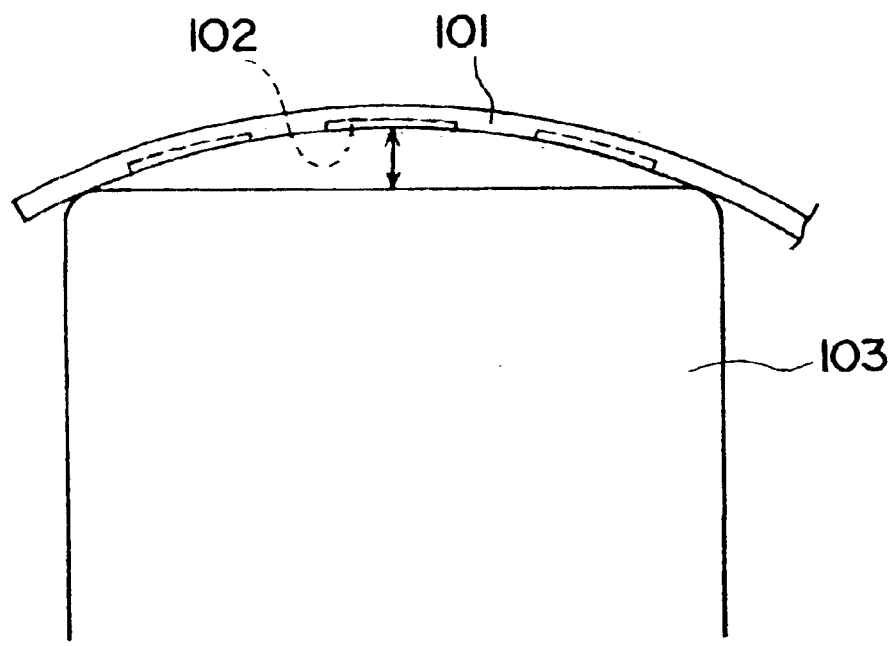
FIG. 32 is a schematic configuration showing spacing between a magnetic head and a magnetic medium.

Also, gap distances t, . . . , t can be changed by obtaining a continual change in the gap (distance) for the entire length of magnetic gaps 4, . . . , 4, instead of establishing the distances for each of magnetic gaps 4, . . . , 4 as described above. In other words, as shown in FIG. 31, each of facing portions 3, . . . , 3 can be formed with curves or continual planes close to curves such that gap distance t continuously changes in the direction of magnetic cores 2, . . . , 2 laid in parallel. Distributions of the magnetic field generated above magnetic gap portions 4 can be established for each section of the facing portion as described previously, or it can be established to change continually.

Also, the number of magnetic core holding portions 6, 6, 6 is the same as the number of magnetic recording channels (three channels in this embodiment) such that magnetic core holding portions 6, 6, 6 can independently hold magnetic cores 2, 2, 2 corresponding to each of the channels. Therefore, it is easy to establish gap distances $t_1$, $t_2$, $t_3$ as desired and to maintain the performance of magnetic head 1 by holding the gap distances as established.

Figure 13:
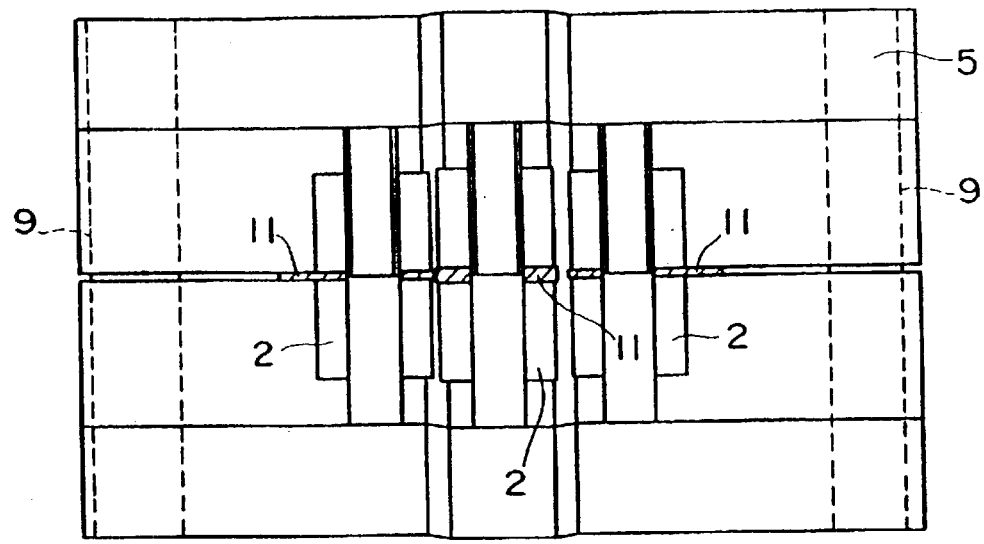
FIG. 13 is a plan view showing a multichannel magnetic head having other adjusting members on both ends of a core holder to fasten core holder half bodies tightly together.
Figure 14:
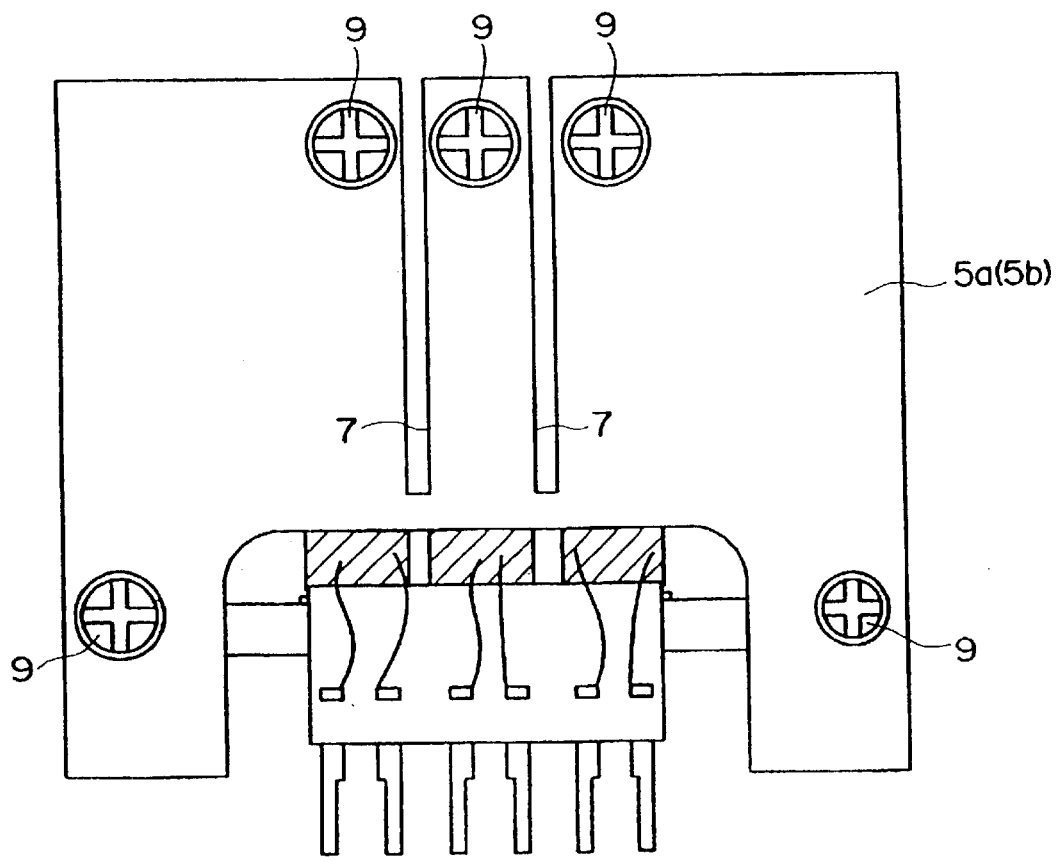
FIG. 14 is a front view showing the multichannel magnetic head having other adjusting members.
Figure 15:
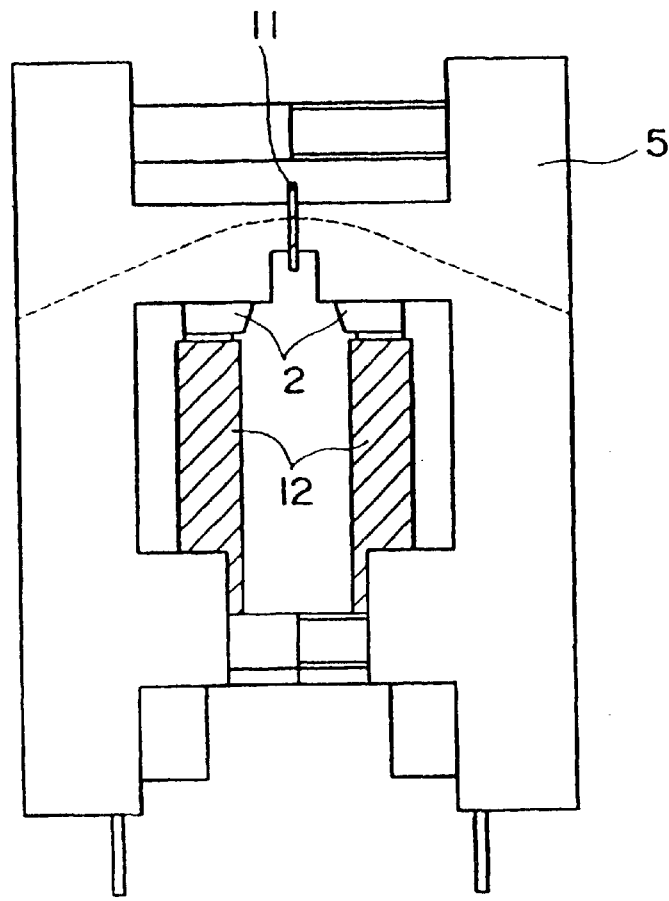
FIG. 15 is a side view showing the multichannel magnetic head having other adjusting members.
Figure 16:
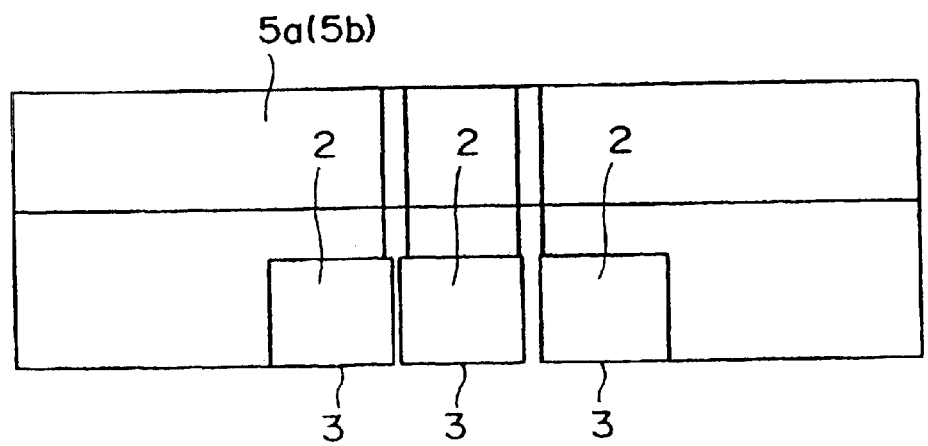
FIG. 16 is a plan view showing a core holder half body and magnetic core half bodies wherein other adjusting members are formed on both ends of the core holder.
Figure 17:
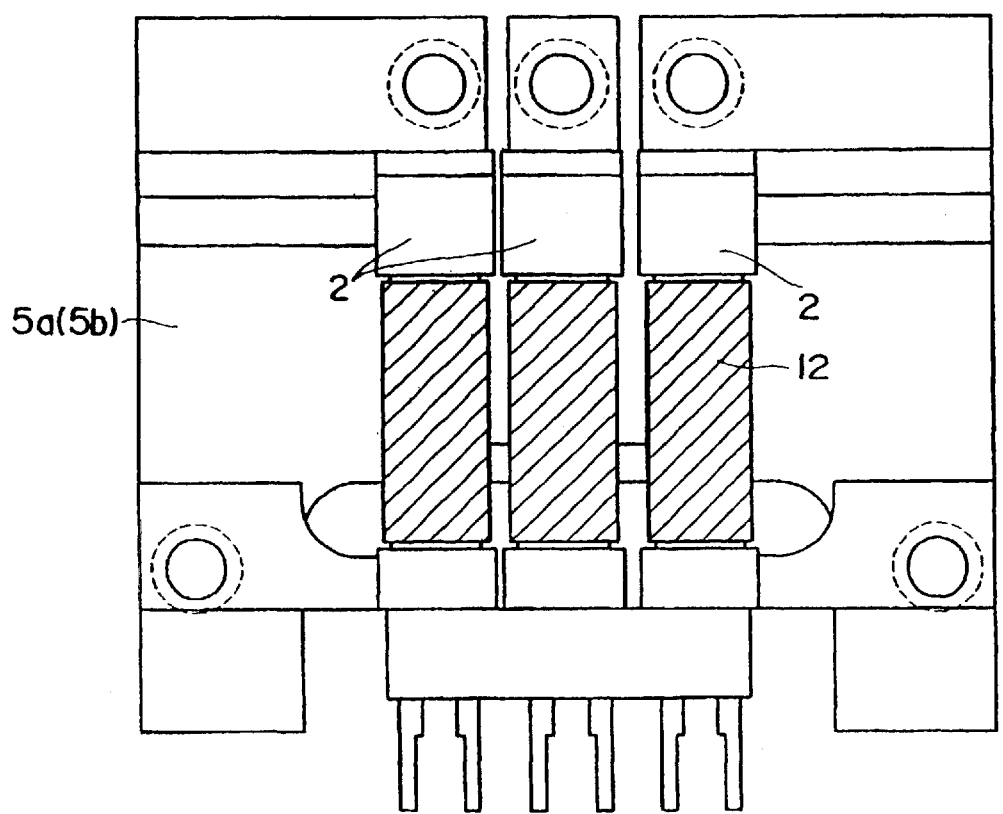
FIG. 17 is a front view showing a core holder half body and magnetic core half bodies wherein other adjusting members are formed on both ends of the core holder.
Figure 18:
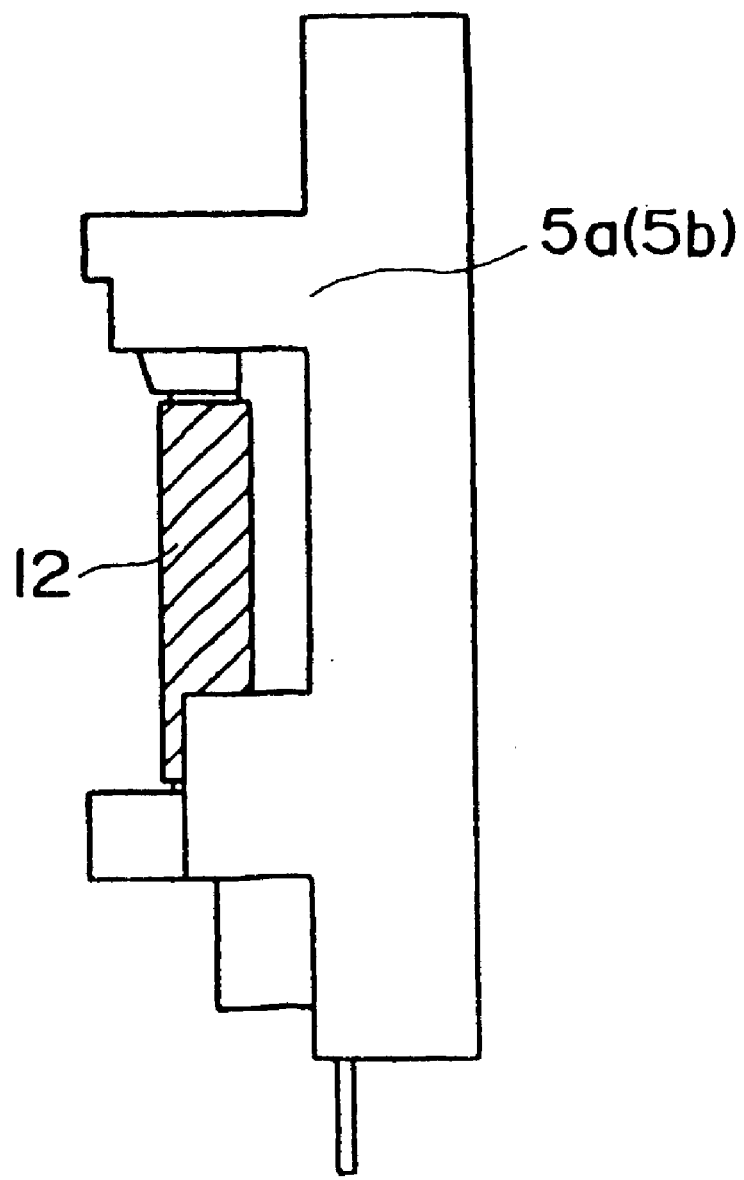
FIG. 18 is a side view showing a core holder half body and magnetic core half bodies wherein other adjusting members are formed on both ends of the core holder.

The above embodiment is one of the preferable embodiments according to the present invention. However, one is not limited to the above; various modifications are applicable within the scope of the invention. In this embodiment, adjusting screw members as adjusting members 9 are formed corresponding to magnetic core holding portions 6, 6, 6 as shown in FIG. 1; however, the mode of adjusting members 9 is not limited thereto. As shown in FIG. 14, for example, other adjusting members 9 can be formed on both ends of core holder 5 to fasten core holder half bodies 5a, 5b tightly together. FIGS. 16 through 18 show a configuration of one of core holder half bodies 5a (or 5b) holding magnetic cores 2, 2, 2 while FIGS. 13 through 15 show a configuration of core holders 5a, 5b facing each other. In this case, adjusting members 9, 9, 9, formed on magnetic core holding portions 6, 6, 6, press magnetic cores 2, 2, 2 against opposing core holder 5b while other adjusting members 9, 9, formed on both ends of core holder 5, fasten core holder half bodies 5a, 5b.

Also, the above description described multichannel magnetic head 1 in which magnetic core holding portions 6, 6, 6 of core holder 5 are adjusted for their slant angles by inserting spacers 11 with different thickness for each channel; however, a means to differ gap distances of magnetic gap portions 4 for each channel is not limited thereto. Instead of differing gap distances $t_1$, $t_2$, $t_3$ using spacers 11 with different thickness, a treatment to form steps can be performed to facing portion 3 of magnetic core 2 in advance.

Figure 19:
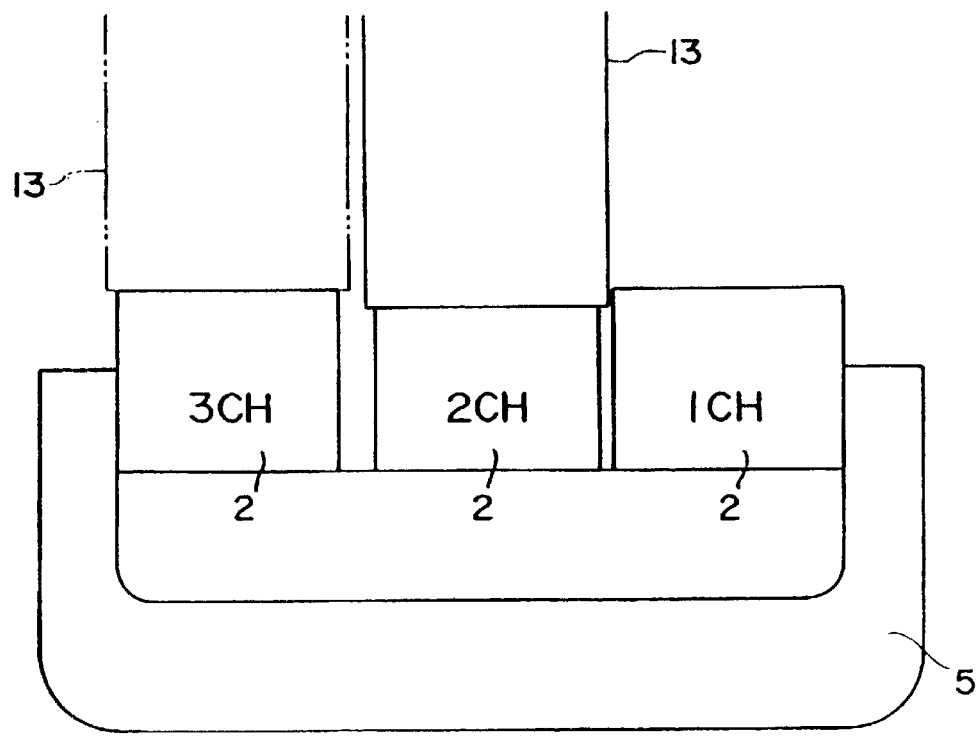
FIG. 19 shows an example of a method for manufacturing a multichannel magnetic head according to the present invention wherein steps are formed with a step-forming treatment using a one-piece whetstone.
Figure 20:
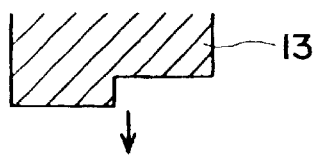
FIG. 20 shows a formed whetstone processed in advance to form steps.
Figure 21:
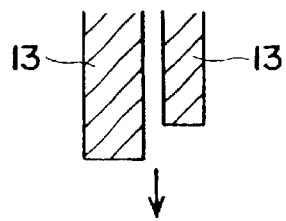
FIG. 21 shows two whetstones placed to form a step.

Examples of the above treatment include formation of magnetic core 2 of magnetic head 1 after a step-forming treatment to facing surfaces which configure magnetic gap portions 4. In this example, steps are formed on the facing surfaces in advance such that magnetic core half bodies 2a, 2b can be placed to face each other as they are without insertion and the like; as a result, gap distances of magnetic cores 2, 2, 2 can be established for desired values. To perform the step-forming treatment to magnetic gap surfaces, as shown in FIG. 19, one-piece whetstone 13 can be used, as well as using a formed whetstone or a plurality of whetstones. For example, as shown in FIG. 20, formed whetstone 13, which is treated in advance with a step-forming treatment, is used for forming steps on facing portion 3 of magnetic core 2; or, as shown in FIG. 21, a step can be formed by using two whetstones 13, 13 which are arranged to form a step.

Figure 22:
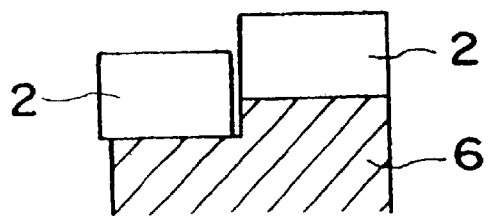
FIG. 22 shows a magnetic core holding portion of a core holder having a step, which is formed in advance, and magnetic cores with identical thickness, which are placed on the magnetic core holding portion.
Figure 23:
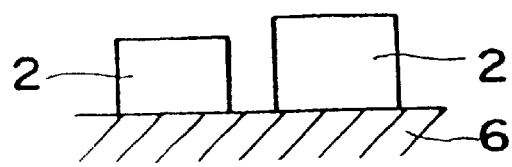
FIG. 23 shows magnetic cores with different thickness placed on a flat magnetic core holding portion.

Also, gap distances can be changed according to the shape of core holder 5 and the thickness (height) of magnetic cores 2. For example, as shown in FIG. 22, a step can be formed in advance at magnetic core holding portions 6, . . . , 6 of core holder 5. Then, gap distances t, . . . , t can be changed by placing magnetic cores 2, . . . , 2 with identical thickness on magnetic core holding portions 6, . . . , 6. Also, as shown in FIG. 23, gap distances t, . . . , t can be changed by placing magnetic cores 2, . . . , 2 with different thickness on flat magnetic core holding portion 6.

Figure 24:
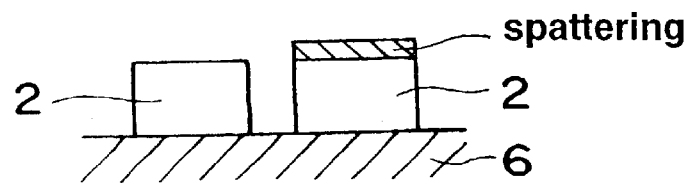
FIG. 24 shows magnetic cores having a step by spattering formation.
Figure 25:
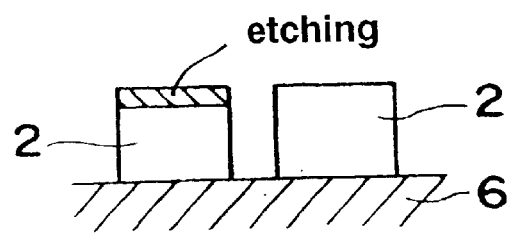
FIG. 25 shows magnetic cores having a step by etching treatment.

Further, steps can be formed by a method other than the treatment with whetstone 13. For example, as shown in FIG. 24, one of magnetic cores 2, which should be formed thicker than another, can be formed with spattering treatment. Or, as shown in FIG. 25, a step can be formed by performing etching treatment.

In any of the above methods, it is still true that gap portions t, . . . , t of a plurality of magnetic gap portions 4, . . . , 4 are changed based on a possibility of spacing with a magnetic medium.

Magnetic head 1 of the above embodiments are applicable to various apparatus using magnetism. For example, multichannel magnetic head 1 of the above can be used as magnetic head 1 in a magnetic card reader. In this case, the magnetic card reader comprises multichannel magnetic head 1 having a plurality of magnetic gap portions 4, . . . , 4 wherein magnetic information is recorded onto a magnetic medium via multichannel magnetic head 1 by transferring the magnetic medium while being in contact with multichannel magnetic head 1. Identical to the above described magnetic head, gap distances t, . . . , t of a plurality of magnetic gap portions 4, . . . , 4 in magnetic head 1 are changed based on a possibility of spacing with a magnetic medium. When multichannel magnetic head 1 in such a magnetic card reader is, for example, magnetic head 1 for three channels, the gap distance of magnetic gap portion 4 corresponding to the middle channel is established to be larger than gap distances of magnetic gap portions 4 on both sides thereof; as a result, sufficient magnetic recording performance can be obtained even when spacing occurs due to warping of a magnetic card and the like.

To show how overwriting changes with a change in spacing in magnetic head 1 of conventional technology, an example using magnetic head 1 having a gap distance of 30 ƒÊm is shown in Table 1. Lo-Co and Hi-Co in the table indicate low coercive force and high coercive force, respectively.

TABLE 1

| Spacing→ ↓ Head | 0 | 8 μm | 12 μm | 16 μm | 20 μm |
|---|---|---|---|---|---|
| Lo-Co | −40 dB | −37 dB | −31 dB | −26 dB | −22 dB |
| Hi-Co | −40 dB | −35 dB | −28 dB | −22 dB | −16 dB |

The following describes a comparison between an embodiment of conventional technology and an embodiment of the present invention by indicating a relationship between gap distance t of magnetic gap portion 4 in magnetic head 1 and magnetic field strength. Herein, the following describes a distribution of magnetic field strength in magnetic head 1 of the present invention when gap distance t of magnetic gap portion 4 of magnetic core is varied. The following Equation 1 shows relationships among gap distance (g), magnetic field in the gap ($H_0$) and magnetic field $H_x$ in the direction in which a magnetic medium is transferred (x direction):

$$\left[\frac{x}{g/2}\right]^2 + \left[\frac{y}{g/2}\alpha\right]^2 = \alpha^2 + 1 \quad \text{[Equation 1]}$$

$$\alpha = \cot\left[\frac{\pi H_x}{H_0}\right]$$

wherein g=gap length (distance), $H_0$=magnetic field in the gap, and $H_x$=magnetic field in the x direction.

Figure 26:
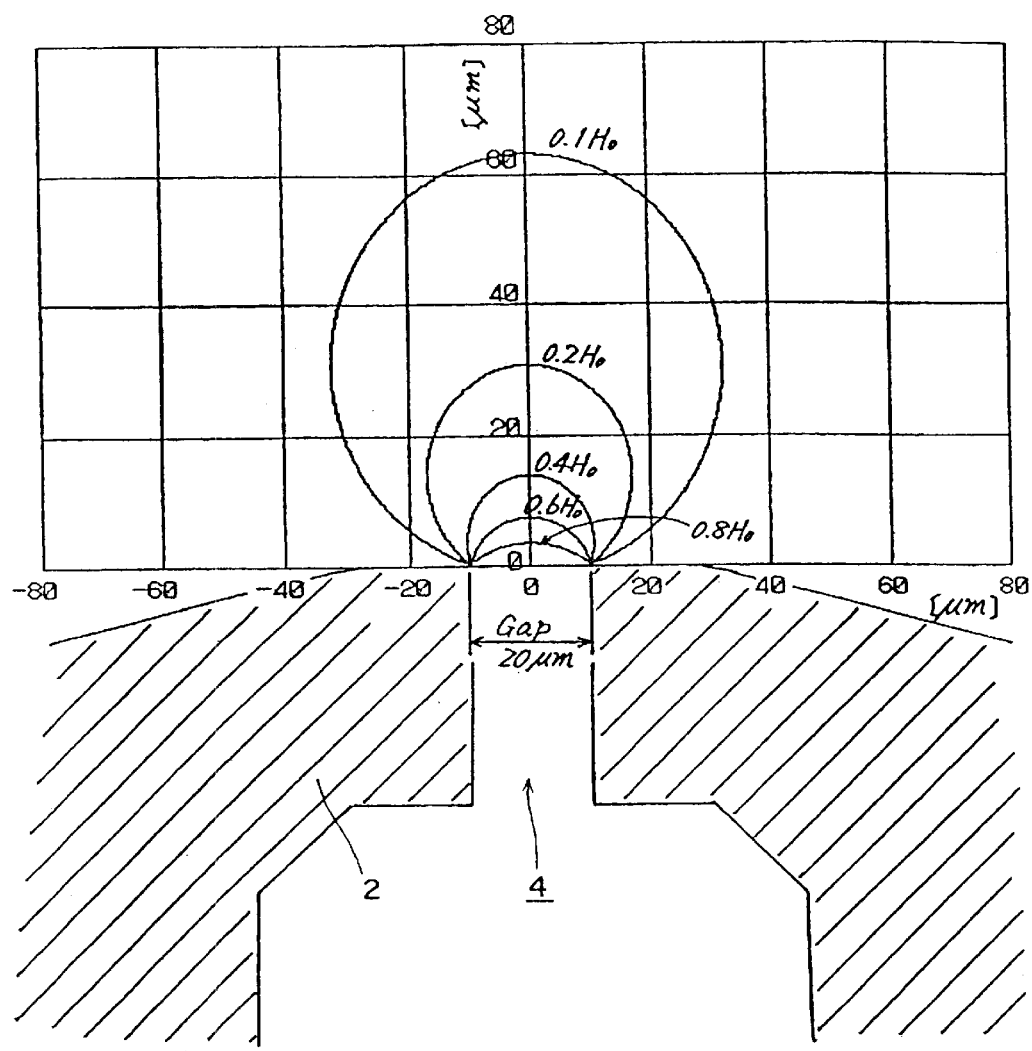
FIG. 26 shows a multichannel magnetic head and a distribution of magnetic field strength when a gap distance is established at 20 µm.
Figure 27:
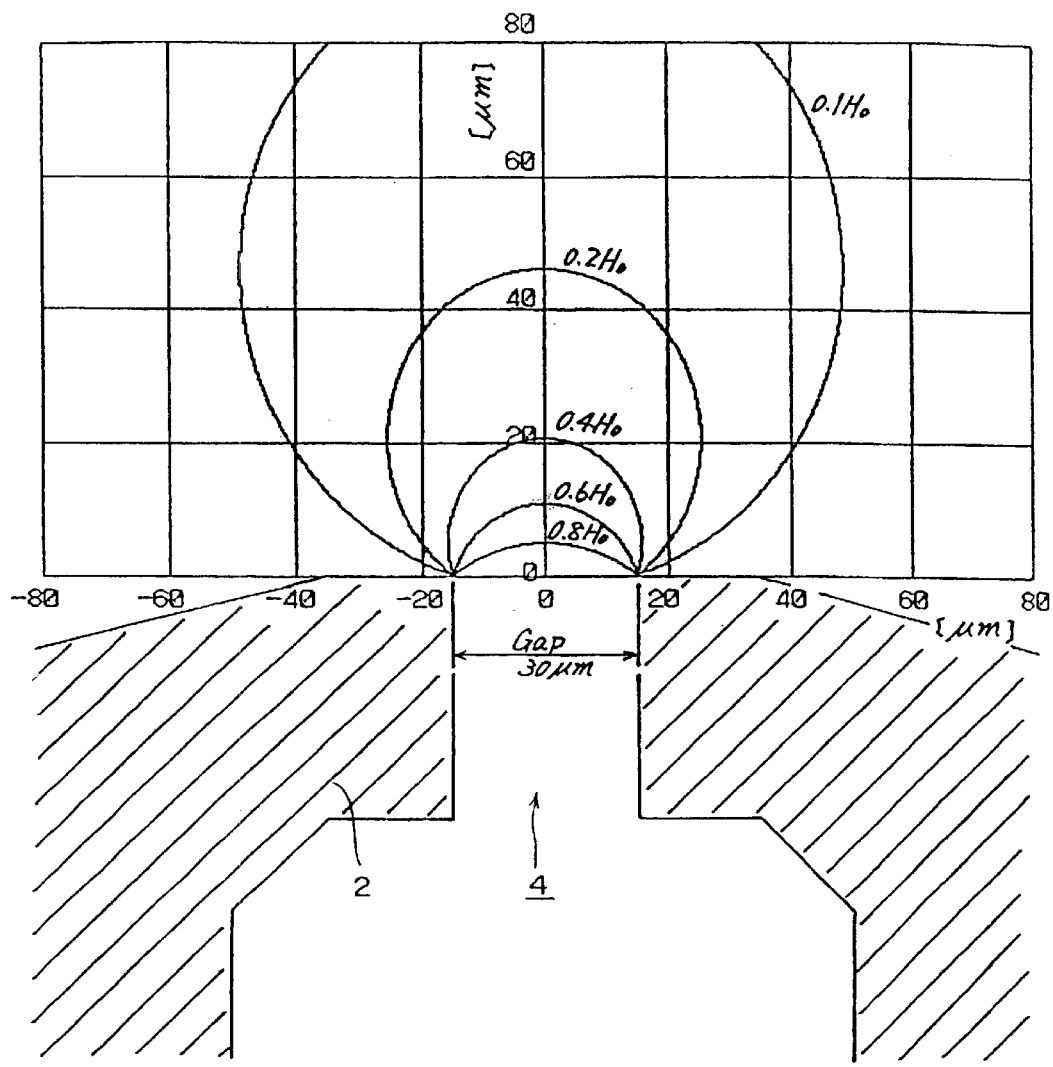
FIG. 27 shows a multichannel magnetic head and a distribution of magnetic field strength when a gap distance is established at 30 µm.
Figure 28:
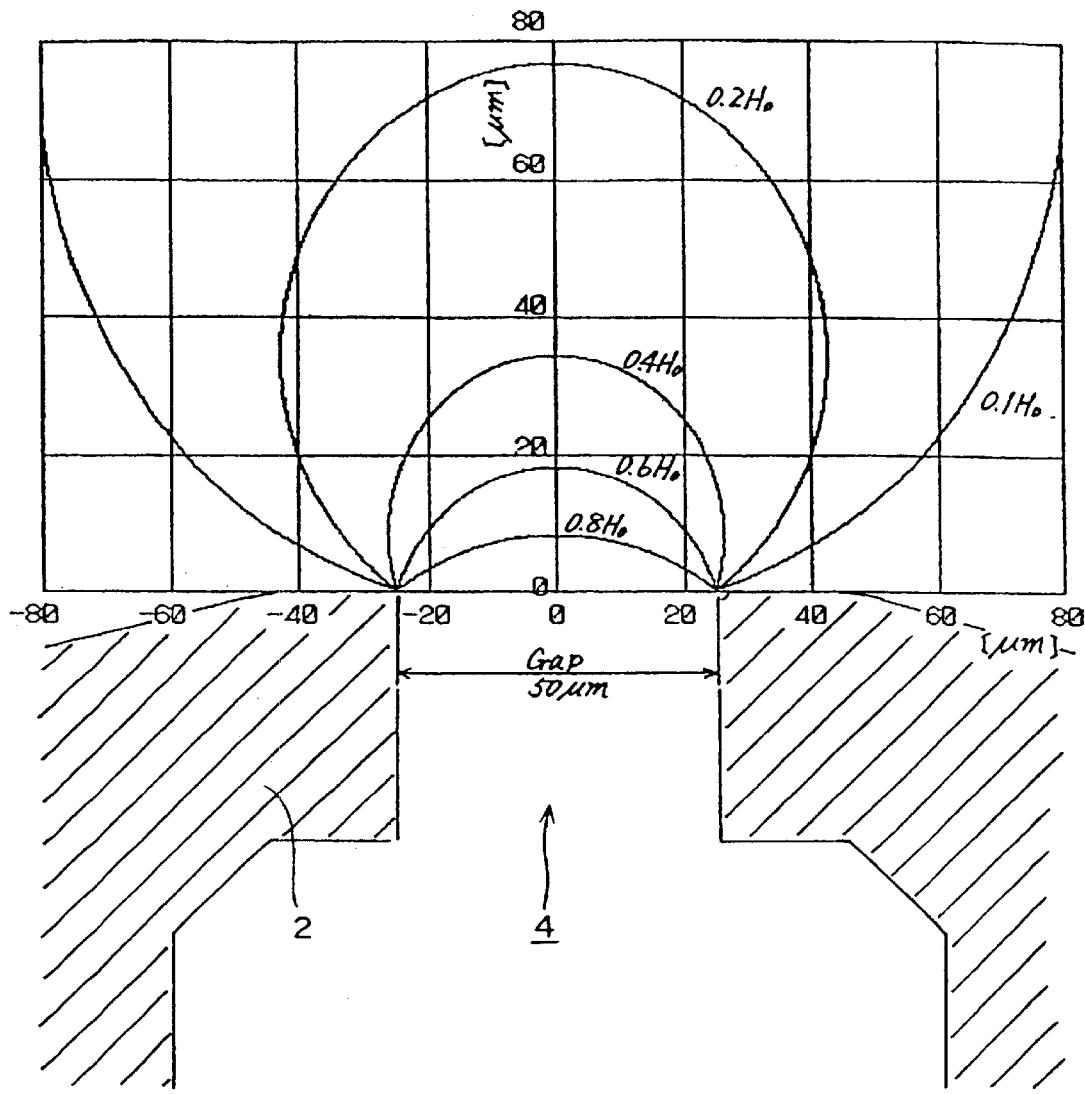
FIG. 28 shows a multichannel magnetic head and a distribution of magnetic field strength when a gap distance is established at 50 µm.
Figure 29:
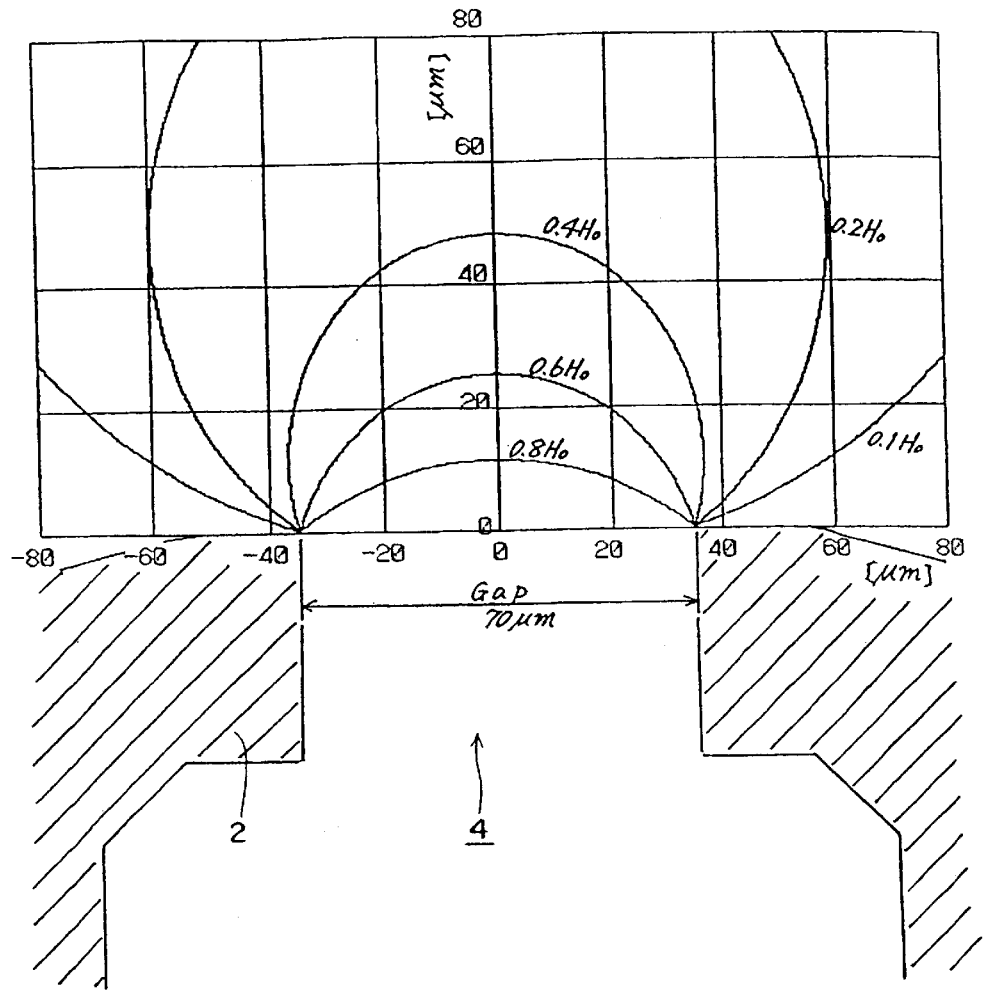
FIG. 29 shows a multichannel magnetic head and a distribution of magnetic field strength when a gap distance is established at 70 µm.
Figure 30:
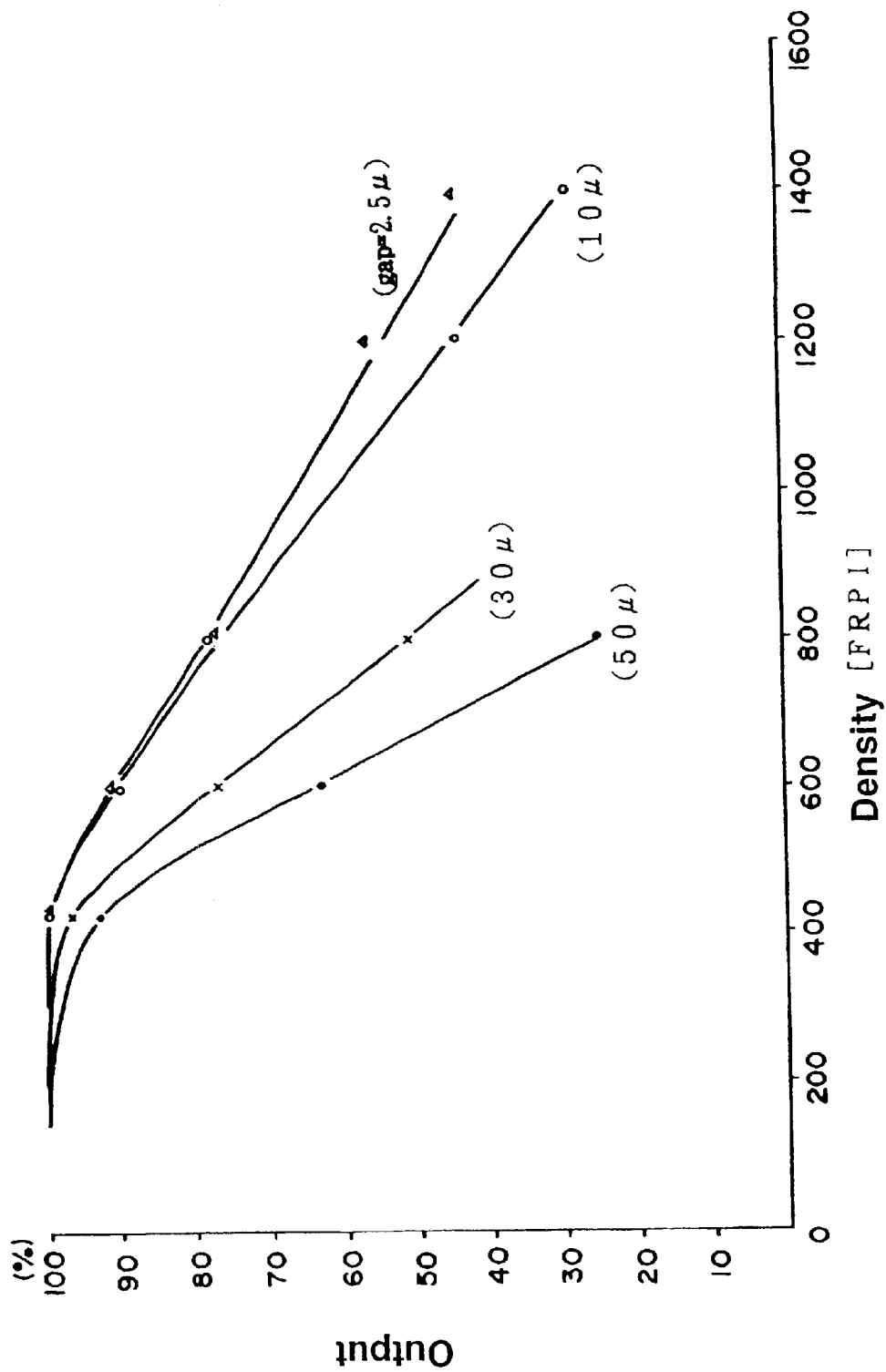
FIG. 30 shows the relationship between recording densities of magnetic head 1 and output levels when gap distances are established at 2.5 µm, 10 µm m, 30 µm and 50 µm.

FIG. 26 shows a distribution of magnetic field strength calculated using Equation 1 when the gap distance is established at 20 μm. Similarly, FIGS. 27, 28 and 29 show the same when the gap distance is established at 30 μm, 50 μm and 70 μm, respectively. As is obvious from distribution circles above magnetic gap portion 4 in the figures, the larger gap distance t is established, the higher expands the distribution of recording magnetic field; accordingly, the distribution of the magnetic field can be changed as desired by changing gap distance t. Also, FIG. 30 shows the relationship between recording densities of magnetic head 1 and output levels when gap distances are established at 2.5 μm, 10 μm, 30 μm and 50 μm.

In the case of a credit card, for example, as magnetic flux return occurs twice when data 1 is used at a recording density of an I-type first channel, which is 8.3 bit/mm as regulated by JIS, the maximum recording density is as follows:

$$8.3 \text{ bit/mm} \times 2 \times 25.4 \text{ mm} = 420 \text{FRPI} \quad \text{[Equation 2]}$$

Herein, FRPI stands for Flux Return Per Inch, which indicates the number of magnetic flux returns per inch. Also, the third channel and the first channel have approximately identical recording density. On the other hand, the second channel has a low recording density compared to the first and the third channels (3 bit/mm as regulated by JIS) wherein the maximum recording density is as follows:

$$3 \text{ bit/mm} \times 2 \times 25.4 \text{ mm} = 152.4 \text{FRPI} \quad \text{[Equation 3]}$$

According to a graph of FIG. 30, the resolving power at 152.4 FRPI is approximately 100%; therefore, the gap distance for the second channel 2 can be increased to 50 μm.

The overwrite in spacing with a high coercive force magnetic head having gap distances t for the first and the third channels to be 30 μm and gap distance t for the second channel to be 50 μm is shown in Table 2.

TABLE 2

| Spacing → ↓ Head | 0 | 8 μm | 12 μm | 16 μm | 20 μm |
|---|---|---|---|---|---|
| 30 μm | −40 dB | −35 dB | −28 dB | −22 dB | −16 dB |
| 50 μm | −40 dB | −37 dB | −32 dB | −27 dB | −22 dB |

As is obvious from Table 2, by establishing only gap distance t for the second channel at 50 μm, which is wider than the others, magnetic recording can be effectively performed to the second channel of the magnetic card recording portion even when spacing occurs. Also, since gap distance t of magnetic head 1 is determined based on a relationship between the recording performance and reading performance, sufficient recording performance can be obtained while maintaining balance with reading performance.

As can be appreciated from the above discussion, a multichannel magnetic head of the present invention provides a desirable distribution of magnetic field strength according to occurrence of spacing by changing gap distances of a plurality of magnetic gap portions based on a possibility of spacing with a magnetic medium. Therefore, even when spacing between the magnetic recording portions and the magnetic head occurs due to warping of the magnetic card, magnetic information can be sufficiently recorded onto the magnetic card.

Also, according to a method for manufacturing a multichannel magnetic head of the present invention, gap distances of a plurality of magnetic gap portions are changed by performing a treatment based on a possibility of spacing with a magnetic medium. Hence, the gap distances are established for each of the magnetic gap portions such that one can manufacture a multichannel magnetic head which provides a desirable distribution of magnetic field strength.

Moreover, one can manufacture a multichannel magnetic head which provides a desirable distribution of magnetic field by using a method for manufacturing a magnetic head in which: a step-forming treatment is performed to facing surfaces configuring a magnetic gap portion; a step-forming treatment is performed to a facing portion using a one-piece whetstone; or a step-forming treatment is performed to the facing surfaces by bringing them into contact with a whetstone which is treated in advance with a step-forming treatment.

In addition, according to the above magnetic card reader, gap distances of a plurality of magnetic gap portions in a multichannel magnetic head are changed based on a possibility of spacing with a magnetic medium while being transferred in contact with the magnetic head. As a result, even when spacing between the magnetic recording portion and the magnetic head occurs due to warping of the magnetic card, magnetic information can be sufficiently recorded onto the magnetic card.

Further, according to a magnetic card reader of the present invention, a gap distance of a magnetic gap portion corresponding to a middle channel of the magnetic head for three channels is established to be larger than gap distances of magnetic gap portions on both sides thereof; consequently, magnetic recording performance of the middle channel of the magnetic card can be improved during magnetic recording with the magnetic head.

While the present invention has been particularly shown and described in conjunction with preferred embodiments thereof, it will be readily appreciated by those of ordinary skill in the art that various changes may be made without departing from the spirit and scope of the invention.

Therefore, it is intended that the appended claims be interpreted as including the embodiments described herein, the alternatives mentioned above, and all equivalents thereto.

What is claimed is:

1. A multichannel magnetic head, comprising:

three and only three channels including two side channels and one middle channel disposed between said two side channels, each channel having a corresponding set of two magnetic core half bodies facing each other and defining a magnetic gap portion therebetween, said magnetic gap portions of said middle channel and said two side channels being disposed on a contacting face that contacts a magnetic medium; and said plurality of magnetic gap portions, when said magnetic medium is moved over said contacting face, transferring data between said magnetic medium and said magnetic head, a gap distance of said magnetic gap portion of said middle channel being larger than said gap distance of said magnetic gap portions of said two side channels to accommodate a physically warped magnetic medium such that when said data is being transferred, two ends of said contacting face contact said warped magnetic medium and a middle portion of said contacting face corresponding to said gap portion of said middle channel is separated from said warped magnetic medium.

2. The multichannel magnetic head according to claim 1, further comprising a case housing said three sets of magnetic half core bodies wherein said gap portions of said three channels are formed at said contacting face.

3. The multichannel magnetic head according to claim 2, further comprising three adjusting members attached to the case with each operable to independently control the gap distance of a corresponding channel.

4. The multichannel magnetic head according to claim 2, further comprising three adjusting screws attached to the case with each being operable to independently control the gap distance of a corresponding channel wherein the rotation of the each screw pushes one magnetic core half body toward the other magnetic core half body to reduce the gap distance therebetween.

5. The multichannel magnetic head according to claim 1, further comprising a spacer disposed between the two magnetic core half bodies of the middle channel.

6. The multichannel magnetic head according to claim 1, further comprising:

a middle channel spacer disposed between the two magnetic core half bodies of the middle channel;

two side channel spacers disposed between the two magnetic core half bodies of a respective side channel, the middle channel spacer having a larger thickness than the two side channel spacers.

7. A method for manufacturing a multichannel magnetic head, comprising the steps of:

placing three and only three channels including one middle channel and two side channels such that said middle channel is disposed between said two side channels, each channel having a corresponding set of two magnetic core half bodies facing each other and defining a magnetic gap portion therebetween, said magnetic gap portions of said middle channel and said two side channels being disposed on a contacting face that contacts a magnetic medium;

setting said gap distance of said middle channel to be larger than said gap distances of said side channels to accommodate a physically warped magnetic medium such that when data is being transferred between said magnetic medium and said magnetic head, two ends of said contacting face contact said warped magnetic medium and a middle portion of said contacting face corresponding to said gap portion of said middle channel is separated from said warped magnetic medium;

recording data onto said magnetic medium as said medium is moved over said contacting face.

8. The method of claim 7, wherein said setting step is carried out by setting gap distances in a step-wise manner to provide steps in gap distances in said plurality of magnetic gap portions.

9. The method of claim 7, wherein said setting step is carried out by using a one-piece whetstone.

10. The method of claim 7, wherein said setting step is carried out by using a one-piece whetstone which is treated in advance with a step-forming treatment.

* * * * *